United States Patent [19]

Miki et al.

[11] Patent Number: 4,681,210
[45] Date of Patent: Jul. 21, 1987

[54] APPARATUS FOR FEEDING BARS THROUGH A BENDING OR LIKE PROCESSING STATION

[75] Inventors: Toshiyuki Miki, Sagamihara; Kunio Tomioka, Kawasaki; Masao Nakajima, Matsuto; Terushige Sakurai, Komatsu, all of Japan

[73] Assignees: Kabushiki Kaisha Komatsu Seisakusho; Aoki Corporation, both of Tokyo, Japan

[21] Appl. No.: 767,991

[22] Filed: Aug. 21, 1985

[30] Foreign Application Priority Data

Aug. 23, 1984 [JP] Japan ................... 59-174026
Aug. 23, 1984 [JP] Japan ............... 59-126971[U]
Aug. 23, 1984 [JP] Japan ............... 59-126973[U]

[51] Int. Cl.$^4$ ................................ B65G 25/00
[52] U.S. Cl. ..................... 198/468.2; 72/307;
72/422; 294/902; 226/115; 226/163
[58] Field of Search ............. 198/468.2, 339.1;
414/745, 753, 226, 749, 14; 72/422, 307, 149;
226/112, 115, 162, 163; 269/280, 283; 294/104, 88, 902

[56] References Cited

U.S. PATENT DOCUMENTS

| | | | |
|---|---|---|---|
| 465,959 | 12/1891 | Yerdon | 269/283 |
| 3,199,443 | 8/1965 | Danly | 414/749 |
| 4,280,786 | 7/1981 | Dyche | 414/749 |
| 4,363,475 | 12/1982 | McCarty | 269/283 |

*Primary Examiner*—Joseph E. Valenza
*Attorney, Agent, or Firm*—Armstrong, Nikaido, Marmelstein & Kubovcik

[57] ABSTRACT

Apparatus for feeding a bar or several bars in a vertical pile along a predetermined horizontal path extending through a bending station, where the bars are bent into desired shape. A first conveyor has mounted thereto a first gripper assembly, which releasably grips the bar or bars, for feeding successive requires lengths of the bar or bars to the bending station. Arranged collinearly with the first conveyor, a second conveyor has a second gripper assembly and coacts with the first conveyor for transporting the bar or bars through, and away from, the bending station with the progress of bar bending. The second gripper assembly is further movable up and down on the second conveyor. Upon completion of the bending of the bar or bars, the second gripper assembly grips the bent bar or bars while being lowered, then is raised for lifting the bar or bars out of engagement with the bending mechanism at the bending station, and then is transported by the second conveyor away from the bending station.

7 Claims, 28 Drawing Figures

APPARATUS FOR FEEDING BARS THROUGH A BENDING OR LIKE PROCESSING STATION

BACKGROUND OF THE INVENTION

Our invention relates to apparatus for feeding a bar or rod, or a plurality of bars or rods at one time, to and away from a processing station therefor such as a bending station where the bar or bars are bent into desired shape. More specifically, our invention is directed to such apparatus capable of feeding successive required lengths of a desired number of bars, such as reinforcing steel bars, in a vertical pile through a bending or like processing station. Hereinafter in this specification and in the claims attached thereto, we will use the word "bar" to denote any elongate material that can be handled by the apparatus of our invention.

A variety of bar feed or transfer apparatus have heretofore been suggested and used in conjunction with bending machines. Examples are found in Japanese Laid Open Utility Model Application No. 57-52217 and Japanese Laid Open Patent Application No. 56-91936. These prior art devices are unsatisfactory in that their longitudinal dimensions are greater than the lengths of bars to be fed thereby. The greater the lenth of bars to be handled, the more is the longitudinal dimension of the apparatus. Thus, by reasons of the floor space required and the manufacturing costs, the prior art apparatus has generally been restricted to use with relatively short bars.

We are also aware conventional apparatus employing pairs of rolls for frictionally feeding bars. The use of feed rolls is objectionable, however, because of errors in feeding lengths due to unavoidable slip.

An additional problem with the prior art arises in conjunction with the simultaneous bending or like processing of a plurality of bars. If their diameter allows, bars should of course be processed in groups of two or more, rather than one by one, for higher production. Heretofore, each group of bars has either been previously fastened together into raftlike form or been fed in a vertical pile between pairs of upstanding guides. The fastening together of successive groups of bars is undesirable because of the separate fastening means required. The provision of the guides for transporting bars in a vertical pile is preferable. As conventionally constructed and arranged, however, the guides have imposed limitations upon the bending or like processing of the bars because of their interference with the movable parts of the feed apparatus or of the bending or like processing mechanism.

SUMMARY OF THE INVENTION

We have hereby invented apparatus whereby any required length of bar or bars can be fed to, and discharged away from, a bending or like processing station, with the longitudinal dimension of the apparatus made considerably less than that of the prior art apparatus designed to handle the same length of bars.

We have also found a solution to the problem of how to feed exactly specified lengths of a bar or a pile of bars, without the need for fastening together the bars to be processed at one time.

Additionally, our invention makes possible the positive guiding of one or more bars by means that do not interfere in any way with the movable parts of the apparatus or with the bar or bars being bent or otherwise processed.

Briefly, our invention may be summarized as apparatus for feeding bars, either singly or in groups of two or more, along a predetermined path extending through a processing station such as a bar bending station, comprising a first conveyor extending between a loading end of the predetermined path and the processing station, and a second conveyor arranged collinearly with the first conveyor and extending between the processing station and an unloading end of the path. Mounted to the first conveyor is a first gripper assembly capable of releasably gripping the bar or bars for transporting same from the loading end to and through the processing station. A second gripper assembly is mounted to the second conveyor via a carriage for up and down motion thereon. The second gripper assembly is capable of releasably gripping the bar or bars for transporting same through the processing station in coaction with the first gripper assembly and further for transporting the processed bar or bars away from the processing station to the unloading end. Lift means on the carriage moves the second gripper assembly up and down thereon, enabling the second gripper assembly to grip the processed bar or bars while being lowered and to subsequently travel upwardly therewith for moving the bar or bars out of engagement with means at the processing station, preparatory to transportation to the unloading end.

Thus each bar or group of bars to be processed may be fed through the processing station by being gripped by either or both of the first and second gripper asemblies. These gripper assemblies are mounted to the respective conveyors to be reciprocably transported toward and away from the processing station. The bar or bars can therefore be fed by successive lengths required for bending or like operation to be performed at the processing station by controlling the travels of the two gripper assemblies. The total length of the two collinear conveyors is unaffected by the length of bars to be handled.

The second gripper assembly is further movable up and down relative to the second conveyor. Consequently, the second gripper assembly functions not only to feed bars through the processing station but also to unload the processed bars from the station.

Preferably, each gripper assembly comprises a pair of gripping jaws pivotable with respect to each other. The gripping jaws are provided with one or more interchangeable pairs of opposed gripping teeth for positively gripping a bar or a pile of bars therebetween against the possibility of feeding errors due to slip. The pairs of gripping teeth are readily replaceable for gripping different numbers of bars depending upon their diameters. Thus the apparatus of our invention is adaptable for different bar diameters through a simple change of the gripping teeth.

Our invention also features collapsible guide means capable of holding in a neat pile each group of bars being fed along the predetermined path as above. The guide means comprises a pair of upstanding guides for slidably engaging the pile of bars therebetween. Normallly held in their working position as under spring pressure, the guides are pivotable against the spring pressure about an axis at right angles with the predetermined path of the bars when hit by one of the gripper assemblies. Further, as required for the bending of the bars, the guides are thoroughly retractable away from the path. Accordingly, while being capable of positively guiding a bar or a pile of bars along the predetermined path, the guide means do not in any way impede the operation of the feeding means of the apparatus or of the means at the processing station.

The above and other features and advantages of our invention and the manner of realizing them will become more apparent, and the invention itself will best be understood, from a study of the following description and appended claims, with reference had to the attached drawings showing some preferable embodiment of our invention.

DESCRIPTION OF THE PREFERRED EMBODIMENT

General

Figure 1:
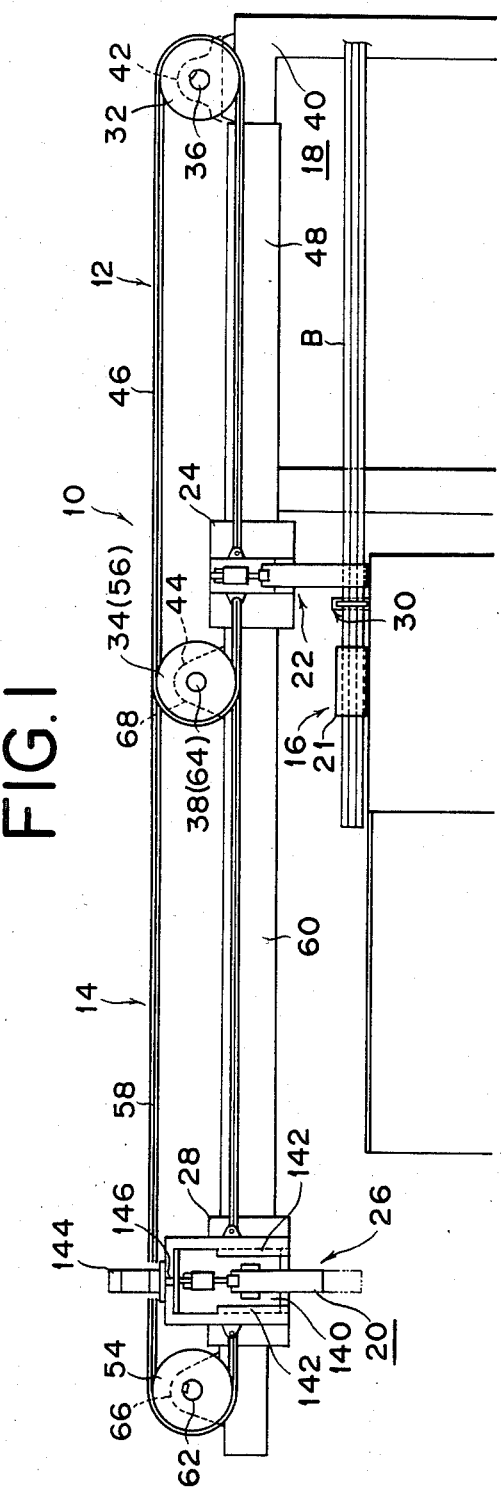
FIG. 1 is an elevation of the apparatus of our invention as adapted for feeding a bar or a vertical pile of bars through a bending station.

We will now describe the apparatus of our invention as adapted for feeding a reinforcing steel bar or bars through a bending station. In FIG. 1 is shown the representative apparatus 10 comprising first 12 and second 14 overhead chain conveyors arranged collinearly for transporting a bar or vertical pile of bars B along a predetermined rectilinear path extending through a bending station 16. The first overhead conveyor 12 extends from the loading end 18 of the predetermined path to the bending station 16, and the second overhead conveyor 14 from the bending station to the unloading end 20 of the predetermined path. A known bending mechanism 21 is provided at the bending station 16 for bending the bar or bars B into desired shape.

A first gripper assembly 22 is dependingly mounted via a carriage 24 to the first overhead conveyor 12, thereby to be reciprocally transported between the loading end 18 and the bending station 16. A second gripper assembly 26 is likewise dependingly mounted via a carriage 28 to the second overhead conveyor 14, thereby to be reciprocally transported between the bending station 16 and the unloading end 20. The second gripper assembly 26 is further movable up and down on the carriage 28, in order that the bars B that have been bent at the bending station 16 may be withdrawn therefrom.

At 30 are shown collapsible guide means for guiding the pile of bars B being transported from the loading end 18 to the bending station 16. The guide means 36 are collapsible when hit by the first gripper assembly 22 and are further retractable so as not to interfere with the bending of the bars B at the bending station 16.

Given hereafter are the more extensive discussions of the above listed overhead chain conveyors 12 and 14, gripper assemblies 22 and 26, colapsible guide means 30, and bending mechanism 21, under the respective headings, followed by the operational description of the complete apparatus 10.

OVERHEAD CHAIN CONVEYORS

Figure 2:
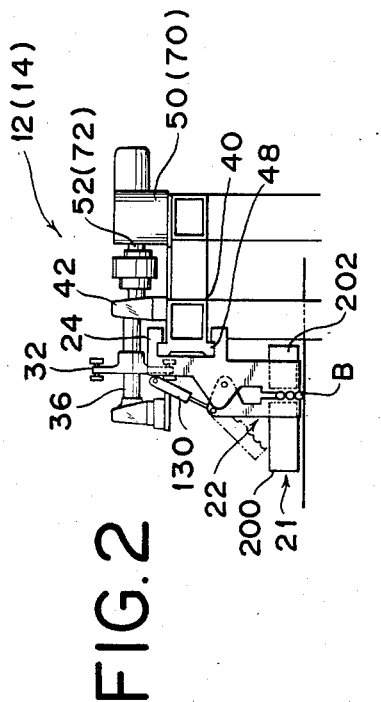
FIG. 2 is an elevation of the apparatus of FIG. 1 as seen from its right hand side.

Reference is directed to both FIGS. 1 and 2 for a study of the overhead chain conveyors 12 and 14. The first overhead conveyor 12 comprises a pair of sprocket wheels 32 and 34 mounted on respective shafts 36 and 38 rotatably and horizontally supported on a frame 40 via respective lugs 42 and 44. A chain 46 extends around the sprocket wheels 32 and 34 and has its opposite extremities anchored to the carriage 24 of the first gripper assembly 22. The carriage 24 is rollable or otherwise movable along a rail 48 mounted to the frame 40 and extending along the predetermined path of the bars B. The right hand sprocket wheel 32, as seen in FIG. 1, of the first overhead conveyor 12 is the drive wheel, being coupled to a motor drive unit 50 via the shaft 36 and motor output shaft 52 as illustrated in FIG. 2.

The second overhead conveyor 14 is similar in construction with the first overhead conveyor 12. Thus the second overhead conveyor 14 comprises a drive sprocket wheel 54, an idler sprocket wheel 56 (hidden behind the sprocket wheel 34 of the first overhead conveyor 12 in FIG. 1), and a chain 58 extending around the sprocket wheels 54 and 56 and having its opposite extremities anchored to the carriage 28 of the second gripper assembly 26. The carriage 28 is rollable or otherwise movable along a rail 60 mounted to the frame 40 in collinear relation with the rail 48 of the first overhead conveyor 12. The sprocket wheels 54 and 56 are mounted on shafts 62 and 64 rotatably and horizontally supported on the frame 40 via lugs 66 and 68, respectively. The drive sprocket wheel 54 is coupled to a motor drive unit 70 (hidden behind the motor drive unit 50 of the first overhead conveyor 12 in FIG. 2) via the shaft 62 and a motor output shaft 72.

GRIPPER ASSEMBLIES

The gripper assemblies 22 and 26 can be of like configuration except that the second gripper assembly 26 is movable up and down on its carriage 28. We will therefore describe only the first gripper assembly 22 in detail, it being understood that the same description substantially applies the second gripper assembly 26. The second gripper assembly will be later explained to an extent necessary for an understanding of its up and down motion on the carriage 28.

Figure 3:
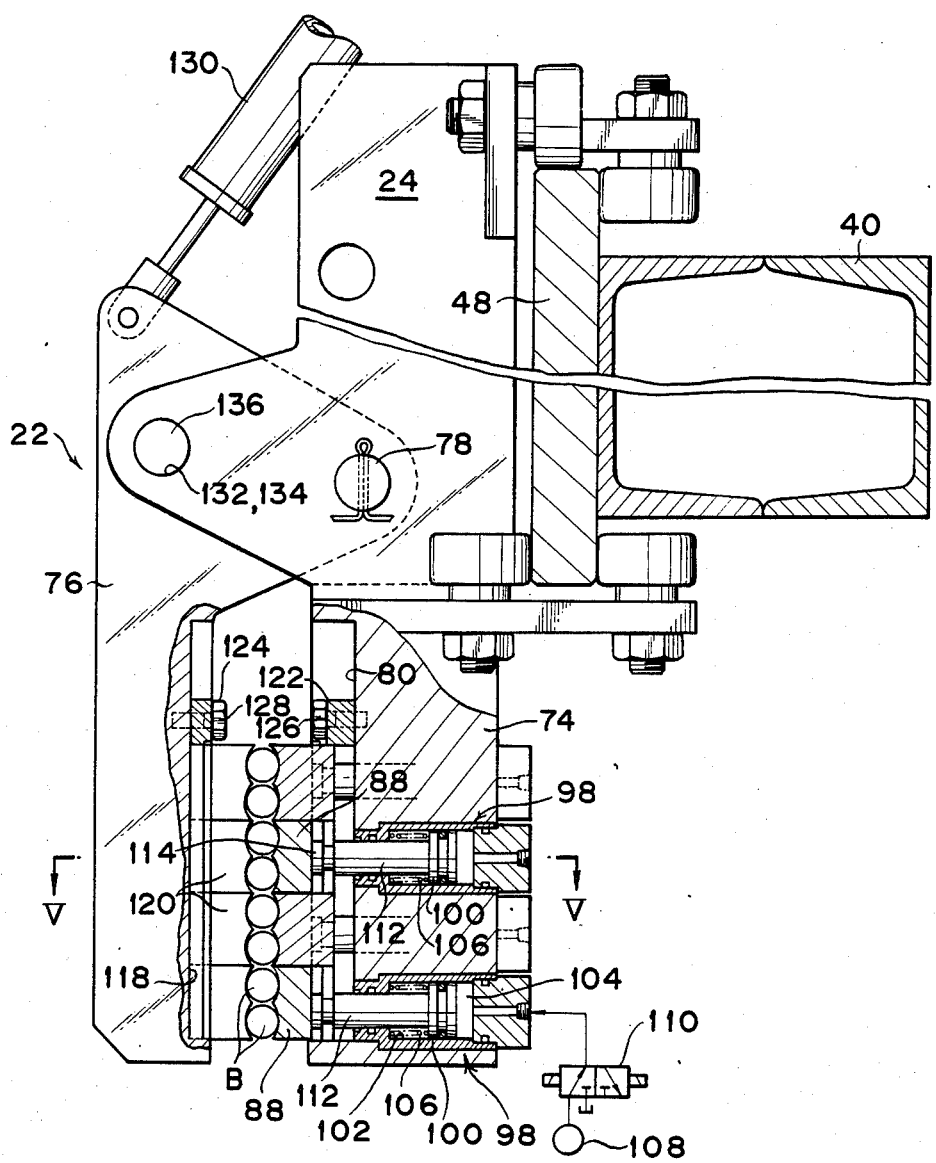
FIG. 3 is an enlarged, fragmentary elevation, partly sectioned for clarity, of the first gripper assembly of the apparatus as seen from its right hand side in FIG. 1.

As illustrated on an enlarged scale in FIG. 3, the representative first gripper assembly 22 comprises a fixed gripping jaw 74 and a movable gripping jaw 76 which are pivotally joined together by a pivot pin 78. We have shown the fixed gripping jaw 74 as being integral with the carriage 24 and depending therefrom. The movable gripping jaw 76 is therefore pivotable about the pin 78 toward and away from the fixed gripping jaw 74 for the engagement and disengagement of one or more bars B between and from the two jaws 74 and 76. FIG. 2 shows eight bars B caught in a vertical pile between the gripping jaws 74 and 76. This number is by way of example only, however, since the gripper assembly 22 is readily adaptable for gripping different numbers of bars, as will become apparent as the description proceeds.

Figure 4:
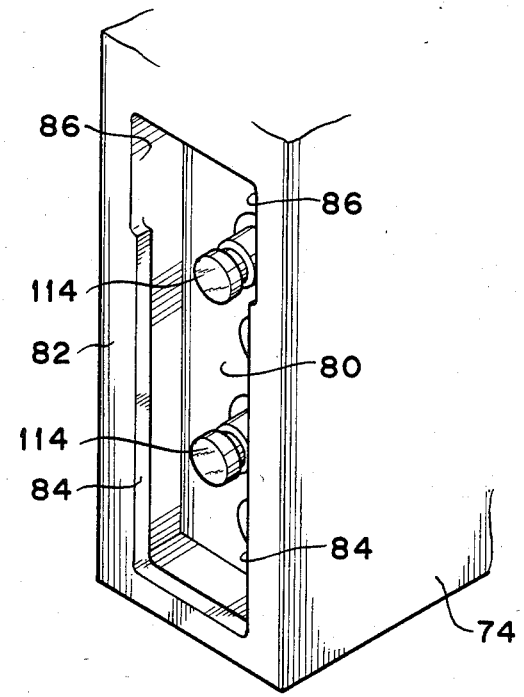
FIG. 4 is a fragmentary perspective view of the fixed gripping jaw of the first gripper assembly of FIG. 3, shown with the gripping teeth removed.
Figure 5:
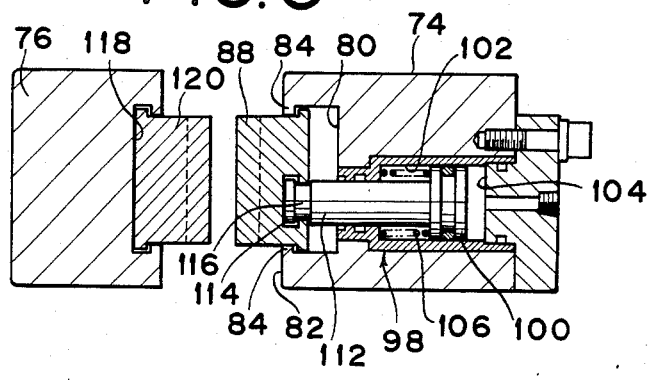
FIG. 5 is a horizontal section through the first gripper assembly of FIG. 3, taken along the line V—V therein.

As will be seen also from FIGS. 4 and 5, the fixed gripping jaw 74 has an undercut groove 80 formed vertically in its front face 82 which is directed toward the movable gripping jaw 76. The undercut groove 80 has a pair of lips 84 on its opposite sides to provide a constricted entrance end. FIG. 4 clearly indicates that the pair of lips 84 are cut off at their upper portions 86.

Figure 6:
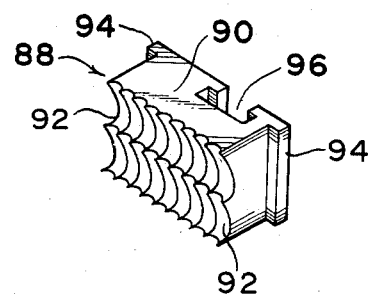
FIG. 6 is a perspective view of one of the gripping teeth to be mounted to the fixed gripping jaw of the first gripper assembly.

Replaceably engaged in the undercut groove 80 in the fixed gripping jaw 74 is one or more, four shown in FIG. 3, gripping teeth 88 each configured as best pictured in FIG. 6. Each gripping tooth 88 has a generally boxlike body 90 having two parallel grooves 92 of approximately arcuate cross section formed in its front face. On the rear side of each gripping tooth 88 there are formed a pair of flanges 94 extending in opposite directions therefrom. An undercut groove 96 is formed in the back of each gripping tooth 88.

The gripping teeth 88 of the above configuration are engaged in a vertical row in the undercut groove 80 in the fixed gripping jaw 74 through its upper end, where the overhanging lips 84 of the undercut groove 80 are cut off to permit such insertion and withdrawal of the gripping teeth in and from the groove. Once inserted in the undercut groove 80, the gripping teeth 88 are restrained from accidental disengagement therefrom as their flanges 96 engage the lips 84. It will be observed from FIG. 5 that the thickness of the flanges 96 of each gripping tooth 88 is considerably less than the depth of the undercut groove 80, so that the gripping teeth are movable back and forth, or toward and away from the movable gripping jaw 76, with respect to the fixed gripping jaw 74.

Figure 7:
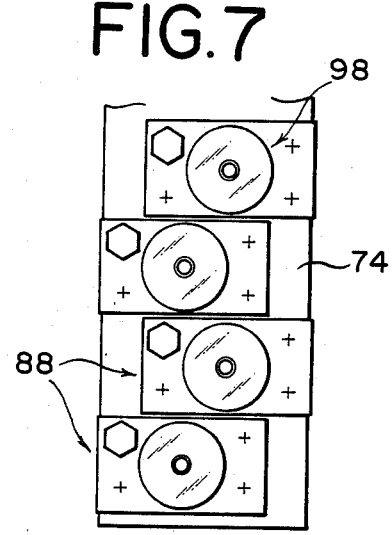
FIG. 7 is an elevation of the fixed gripping jaw of the first gripper assembly, as seen from its right hand side in FIG. 3.

FIGS. 3, 5 and 7 indicate that the fixed gripping jaw 74 has further a plurality of, four in the illustrated embodiment, fluid actuated cylinders 98 mounted therein. Each extending in the front to rear thickness direction of the fixed gripping jaw 74, the four fluid actuated cylinders 98 are arranged in two vertical rows staggered with respect to each other. The fluid actuated cylinders 98 are of the single acting, spring return type, each having slidably mounted therein a piston 100 defining a spring chamber 102 and a fluid chamber 104 on its opposite sides. The spring chamber 102 accommodates a helical compression spring 106 biasing the piston 100 rearwardly, or in a direction away from the undercut groove 80 in the front face of the fixed gripping jaw 74. The fluid chamber 104 can be placed in and out of communication with a source 108, FIG. 3, of fluid under pressure by a valve 110. A piston rod 112 extends forwardly from the piston 100 and protrudes into the undercut groove 80 in the fixed gripping jaw 74. As best seen in FIG. 5, the piston rod 112 terminates in a head 114 via a constricted neck 116. Upon mounting of each gripping tooth 88 in the undercut groove 80 in the fixed gripping jaw 74 through its top end, the relatively enlarged head 114 of the piston rod 112 becomes engaged in the undercut groove 96 in the back of the gripping tooth, with the result that the gripping tooth becomes constrained to joint back and forth travel with the piston rod 112 relative to the fixed gripping jaw.

As shown in both FIGS. 3 and 5, the movable gripping jaw 76 also has an undercut groove 118 defined vertically in its face 120 confronting the fixed gripping jaw 74. Shown engaged in this undercut groove 118 is another set of four gripping teeth 120 similar in configuration with the first described set of gripping teeth 88 except that the second set of teeth 120 have no undercut groove in their backs. The second set of gripping teeth 120 can be inserted in the undercut groove 118 the same way as the first set of gripping teeth 88 are inserted in the undercut groove 80. At 122 and 124 in FIG. 3 are shown retainers, complete with mounting screws 126 and 128, for holding the respective sets of gripping teeth 88 and 120 in position in the undercut grooves 80 and 118.

When the movable gripping jaw 76 is closed against the fixed gripping jaw 74 as in FIG. 3, the two sets of gripping teeth 88 and 120 thereon conjointly engage and tightly hold the bars B in a neat pile therebetween, with each opposed pair of gripping teeth 88 and 120 coacting to hold two bars in this particular embodiment. A fluid actuated cylinder 130, FIG. 3, acts between carriage 24 and movable gripping jaw 76 for pivoting the latter toward and away from the fixed gripping jaw 74. The gripping jaws 74 and 76 have holes 132 and 134 formed transversely therethrough. These holes 132 and 134 come into register with each other when the movable gripping jaw 76 is closed against the fixed gripping jaw 74, for receiving a lockpin 136 whereby the movable gripping jaw is locked against pivotal motion away from the fixed gripping jaw. The bars B are fed along the predetermined path with the gripping jaws 74 and 76 thus positively locked together.

Figure 9:
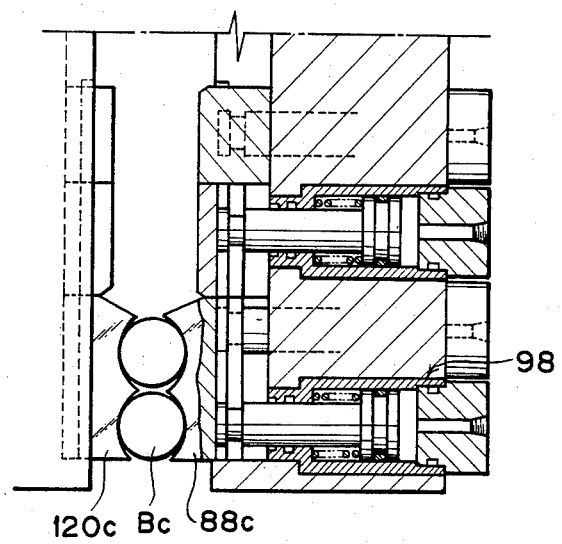
FIG. 9 is a view similar to FIG. 8 except that the pair of gripping jaws are shown fitted with different gripping teeth for gripping bars of still greater diameter.
Figure 10:
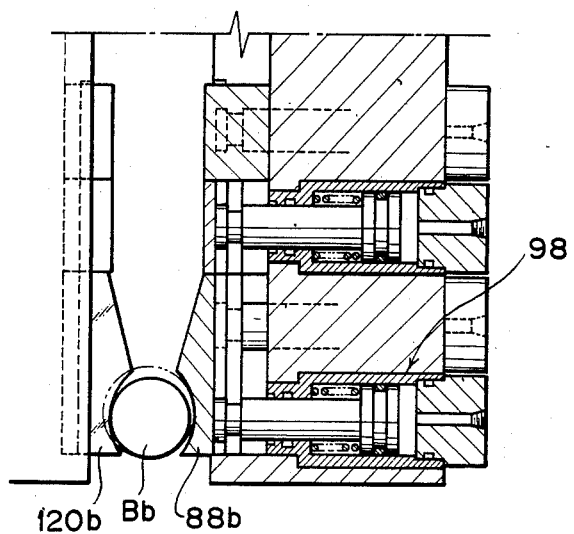
FIG. 10 is also a view similar to FIG. 8 except that the pair of gripping jaws are shown fitted with different gripping teeth for gripping a bar of further greater diameter.

It is desirable that the load exerted on the bending mechanism 21, FIGS. 1 and 2, be constant irrespective of various diameters of bars to be bent. Thus, with an increase in bar diameter, the correspondingly smaller number of bars must be piled and bent at one time. We have therefore provided various sizes of interchangeable gripping teeth as shown at 88a and 120a in FIG. 8, at 88b and 120b in FIG. 9, and at 88c and 120c in FIG. 10, in addition to the gripping teeth 88 and 120 of FIGS. 3 and 5.

Figure 8:
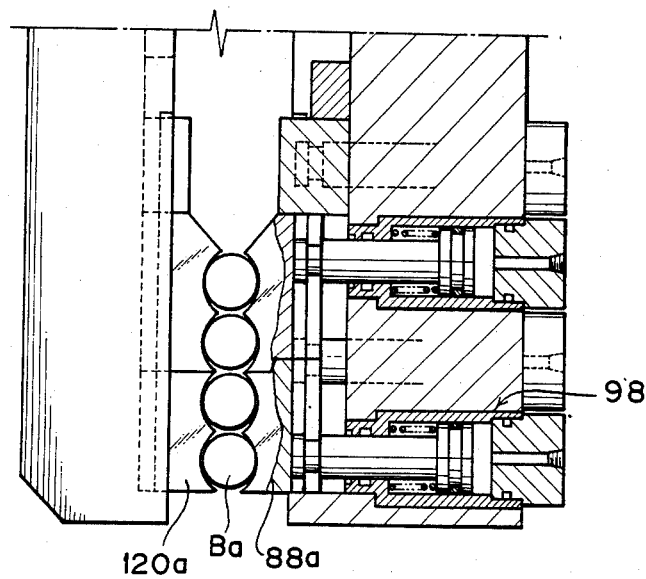
FIG. 8 is a vertical section, partly in elevation, through the first gripper assembly of FIG. 3, the pair of gripping jaws of the gripper assembly being shown fitted with gripping teeth different from those shown in FIG. 3 for gripping bars of greater diameter.

As will be seen by referring back to FIG. 3, the four pairs of gripping teeth 88 and 120 ilustrated therein grip a total of eight bars B, with each gripping tooth 88 energized by one fluid actuated cylinder 98. In FIG. 8, then, the two pairs of gripping teeth 88a and 120a grip a total of four bars Ba of slightly greater diameter, with the two gripping teeth 88a energized by three cylinders 98. The one pair of gripping teeth 88b and 120b in FIG. 9 grip two bars Bb of still greater diameter, with the gripping tooth 88b energized by two cylinders 98. The one pair of gripping teeth 88c and 120c of FIG. 10 grip only one bar Bc of further greater diameter, with the gripping tooth 88c energized by two cylinders 98. The retainers 122 and 124 of FIG. 3 may be removed by loosening the screws 126 and 128 for the interchange of these sets of gripping teeth 88 and 120, 88a and 120a, 88b and 120b, and 88c and 120c.

When the four pairs of gripping teeth 88 and 120 grip the eight gripping bars B as in FIG. 3, for example, the fluid actuated cylinder 130 is of course extended to hold the movable gripping jaw 76 closed against the fixed gripping jaw 74. The lockpin 136 is inserted in the aligned holes 132 and 134 in the jaws 74 and 76 to lock the movable gripping jaws 76 in the closed position. Further, as shown also in FIG. 3, the valve 110 is opened to supply pressurized fluid from its source 108 to the fluid chambers 104 of all the fluid actuated cylinders 98 in the fixed gripping jaw 74, thereby causing extension of these cylinders against the forces of the return cylinders 106. The gripping teeth 88 coupled to their piston rods 112 are therefore displaced forwardly to force the bars B against the teeth 120 on the movable gripping jaw 76. The bars B can thus be firmly gripped under fluid pressure. The fluid supplied to the cylinders 98 can be either hydraulic oil or air.

For releasing the bars B from the gripper assembly 22, the lockpin 136 may be withdrawn from the holes 132 and 134, and the cylinder 130 may be contracted to pivot the movable gripping jaw 76 away from the fixed gripping jaw 74.

For changing the set of four pairs of gripping teeth 88 and 120 with any of the other sets of gripping teeth 88a and 120a, 88b and 120b, and 88c and 120c, the valve 110 may be actuated to place the fluid chambers 104 of the cylinders 98 in communication with the fluid drain. Their positions 100 will then travel rightwardly, as seen in both FIGS. 3 and 5, under the forces of the return springs 106. The gripping teeth 88 on the fixed gripping jaw 74 can now be withdrawn from the undercut groove 80 through its top end after removing the retainer 122. The gripping teeth 120 on the movable gripping jaw 76 can likewise be withdrawn from the undercut groove 118 through its top end after removing the retainer 124. A new set of gripping teeth may then be fitted in the undercut grooves 80 and 118 in both jaws 74 and 76. The gripping teeth that have been introduced in the undercut groove 80 in the fixed gripping jaw 74 will readily engage with the heads 84 of the piston rods 112 as these heads are held in a preassigned position within the groove by the return springs 106 of the cylinders 98.

We have stated that the second gripper assembly 26, FIG. 1, is analogous in construction with the first gripper assembly 22 described above, except that the second gripper assembly is movable up and down on its carriage 28. With reference to FIG. 1, therefore, it will be seen that the second gripper assembly 26, or its member corresponding to the fixed gripping jaw 74 of the first gripper assembly 22, is mounted on the carriage 28 via a second carriage 140 which is movable up and down on the first carriage 28 as guided by a pair of guides 142. Mounted uprightly on the first carriage 28, a fluid actuated cylinder 144 has a piston rod 146 depending therefrom and coupled to the second carriage 140. The second gripper assembly 26 is normally held lowered on the first carriage 28, to the position indicated by the dashed lines in FIG. 1, in which the second gripper assembly is on a level with the first gripper assembly 22. The second gripper assembly 26 is to be raised only for the withdrawal of the bent bars from the bending station 16.

COLLAPSIBLE GUIDE MEANS

Figure 11:
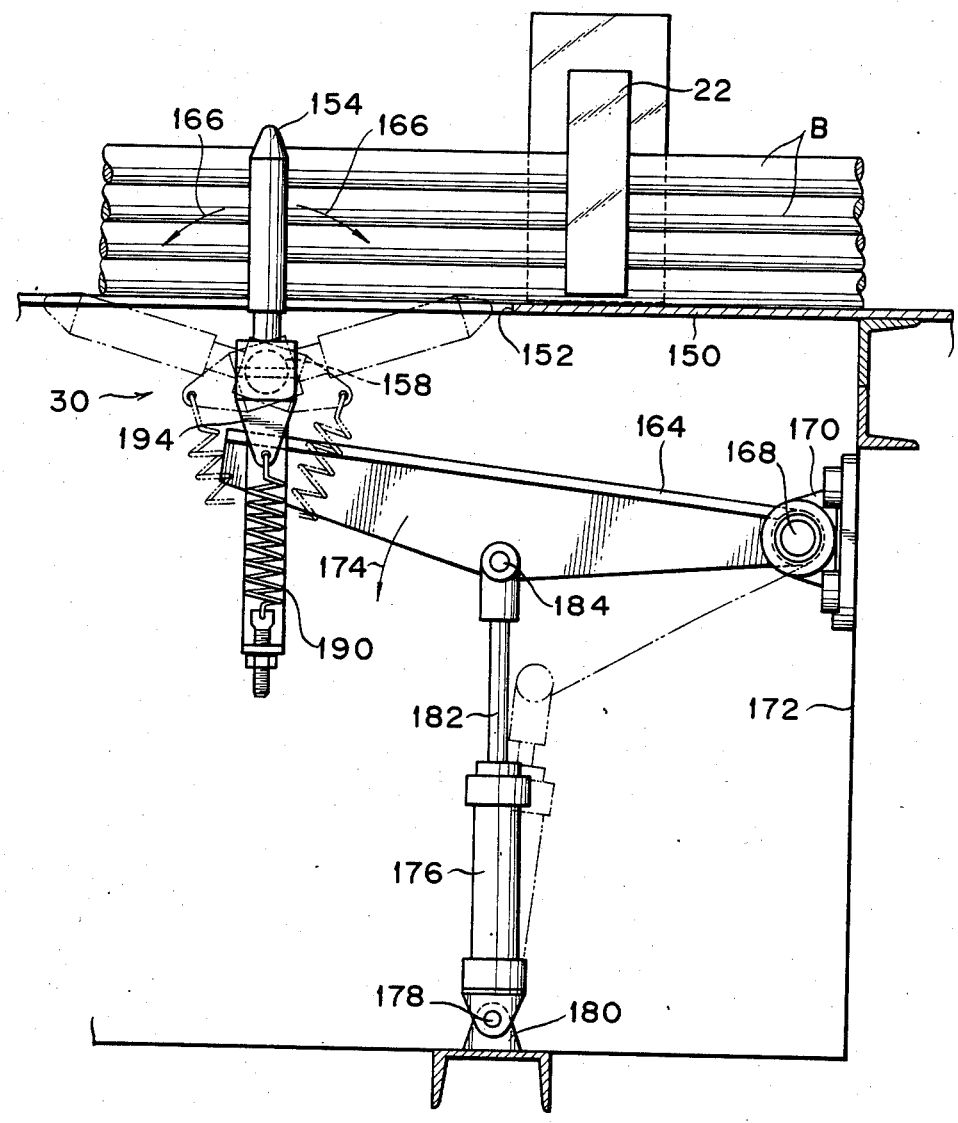
FIG. 11 is an enlarged, fragmentary vertical section through the apparatus of FIG. 1, showing in particular the collapsible guide means included therein.
Figure 12:
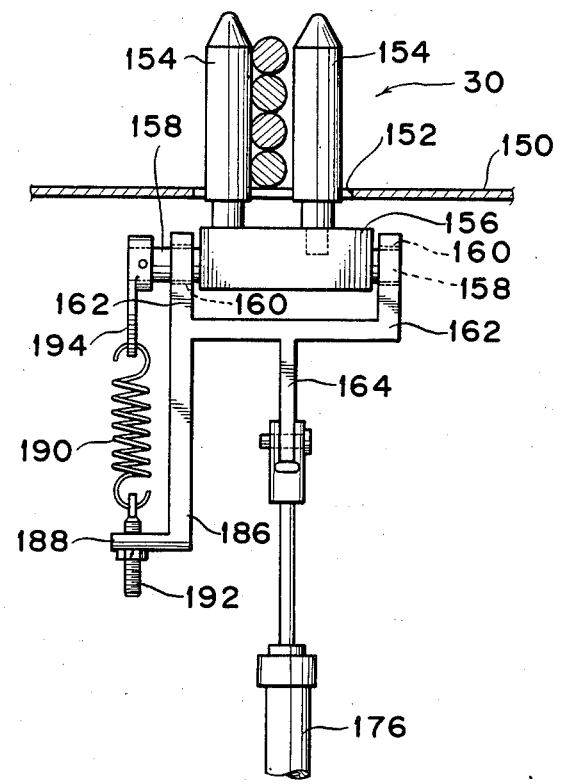
FIG. 12 is a left hand side elevation of the collapsible guide means of FIG. 11.

We have illustrated the collapsible guide means 30 in detail in FIGS. 11 and 12. The apparatus 10 has a platform 150 on or over which the bar or bars B are transported by the first gripper assembly 22 to the bending station 16. The platform 150 is apertured at 152 through which a pair of guide rods 154 of the collapsible guide means 30 normally extend upwardly with considerable clearance at least in the traveling direction of the bars B. Thus normally extending across the path of the bars B, the guide rods 154 are spaced apart from each other a sufficient distance for slidably holding the bars B in a neat stack therebetween.

The pair of guide rods 154 are both planted on a guide mount 156 having a pair of trunnions 158 extending from its opposite ends in alignment with each other in a horizontal direction at right angles with the path of the bars B. The trunnions 158 are rotatably journaled in bearings 160 on a pair of prongs 162 on the distal end of a pivotal carrier arm 164. Consequently, the pair of guide rods 154 are pivotable relative to the carrier arm 164 in either direction about the axis of the trunnions 158, as indicated by the arrows 166 in FIG. 11. The carrier arm 164 is proximally pivoted at 168 on a lug 170 on a wall 172 supporting the platform 150, so that the carrier arm 164 together with the guide rods 154 thereon is pivotable in a vertical plane as indicated by the arrow 174 in FIG. 11. For such pivotal motion of the carrier arm 164, a fluid actuated cylinder 176 has its head end pivoted at 178 to a fixed lug 180 and has its piston rod 182 pin jointed to the carrier arm at 184 intermediate the opposite ends thereof.

As better seen in FIG. 12, one of the prongs 162 of the carrier arm 164 has a downward extension 186 terminating in a bend 188. A helical compression spring 190 extends between an adjusting bolt 192 on the bend 188 and a lever 184 on one of the trunnions 158 of the guide mount 156.

Thus, when the cylinder 176 is held extended as in FIGS. 11 and 12, the pair of guide rods 154 of the collapsible guide means 30 normally extend upwardly through the aperture 152 in the platform 150 under the bias of the tension spring 190. The guide rods 154 when in this working position slidably engage each pile of bars B therebetewen, making it possible for the bars to be fed to the bending station without the need for fastening the bars together. Traveling back and forth along the path of the bars, the first gripper assembly 22 on the first overhead chain conveyor 12 will come into abutment against the guide rods 154 in either direction. Then the guide rods 154 will pivot about the axis of the trunnions 158 against the force of the tension spring 190 to either of the phantom positions of FIG. 11, thereby enbabling the gripper assembly 22 to ride thereover in either direction. Following the passage of the gripper assembly 22, the guide rods 154 will spring back to the solid line working position of FIG. 11. Further, when the bars B are bent at the bending station 16, FIGS. 1 and 2, the cylinder 176 may be contracted to cause the carrier arm 164 to pivot in a counterclockwise direction, as viewed in FIG. 11, about the pivot pin 168. Then the guide rods 154 will recede down into the platform 150, thereby avoiding interference with the bars being bent out of their path.

BENDING MECHANISM

Referring again to FIGS. 1 and 2, we will explain the bending mechanism 21 at the bending station 16 only to an extent necessary for an understanding of our invention, since the bending mechanism constitutes no essential feature of our invention. The bending mechanism 21 comprises a pair of bending rolls 200 and 202, one fixed and the other movable arcuately about the axis of the other. The pile of bars B are bent altogether by being pressed against the fixed bending roll by the movable bending roll.

Figure 13:
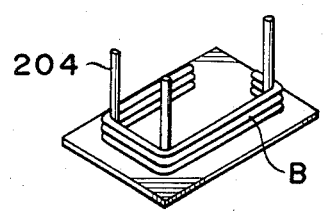
FIG. 13 is a perspective view diagrammatically showing a set of holder posts at the bending station of the apparatus of FIG. 1, together with a pile of bent bars engaged around the holder posts.

Although not shown in FIGS. 1 and 2, and shown instead in FIG. 13, a plurality of holder posts 204 are erected at the bending station 16. The bars B that have been bent by the bending rolls 200 and 202 are held in position by these holder posts 204, until they are lifted off the posts by the second gripper assembly 26 on the second overhead conveyor 14, as will be detailed in the following description of operation.

OPERATION

We will describe the apparatus 10 of the foregoing configuration on the assumption that the pile of bars B, having a length Lo as at (A) in FIG. 14, is to be bent right angularly at three different points thereon into generally rectangular form, as at (B), (C) and (D) in FIG. 4. Of course, only one bar may be bent in a like manner if its diameter is too large for the simultaneous bending of two or more bars.

Figure 14A:
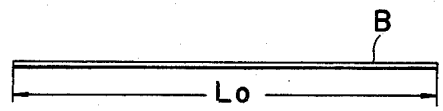
FIGS. 14(A) through (D) are views explanatory of sequentials steps of bending a bar or bars at the bending station of the apparatus of FIG. 1.
Figure 14B:
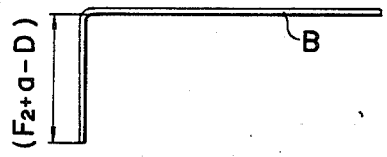
Figure 14C:
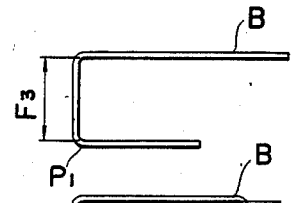
Figure 14D:
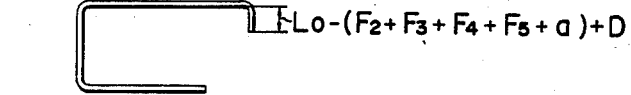
Figure 15A:
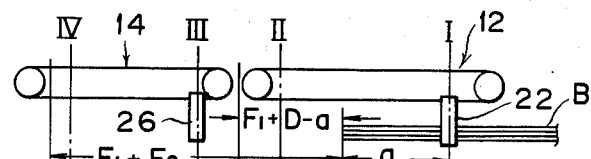
FIGS. 15(A) through (K) are views explanatory of sequential steps of feeding a bar or bars by the apparatus of FIG. 1 in the case where the bar or bars are bent as shown in FIGS. 14(A) through (D).
Figure 15B:
Figure 15C:
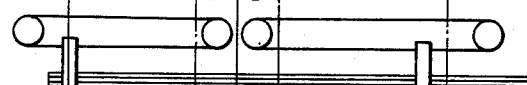
Figure 15D:
Figure 15E:
Figure 15F:
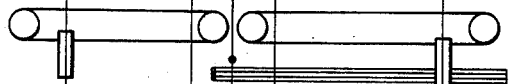
Figure 15G:
Figure 15H:
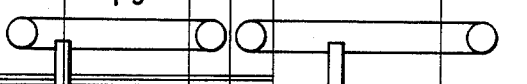
Figure 15I:
Figure 15J:
Figure 15K:
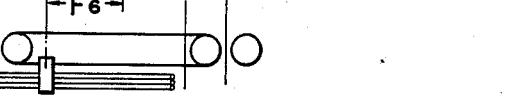

At (A) through (K) in FIG. 15 is illustrated one complete cycle of operation of the apparatus 10 in conjunction with the bending operation of FIGS. 14(B) through 14(D) at the bending station 16. In these figures the characters F1 designates the full stroke (between positions I and II) of the first gripper assembly 22; F2 the full stroke (between positions III and IV) of the second gripper assembly 26; and D the distance between the extreme left hand position II of the first gripper assembly 22 and a line connecting the axes of the bending rolls 200 and 202, as well as the distance between the extreme right hand position III of the second gripper assembly 26 and the line connecting the bending roll axes.

First of all, as at (A) in FIG. 15, the first gripper assembly 22 at its extreme right hand position I grips the pile of bars B at a point distanced a from their leading end. The distance a must be at least equal to twice the above defined distance D, for a reason that will become apparent presently. The second gripper assembly 26 is now held standing by at its extreme right hand position III.

Then, as shown at (B) in FIG. 15, the bars B gripped by the first gripper assembly 22 is fed forwardly by the first overhead conveyor 12 until the first gripper assembly reaches the extreme left hand position II. Thus fed the distance F1, the bars B can have their leading ends gripped by the second gripper assembly 26, which has been left standing by at its extreme right hand position III, because the first gripper assembly 22 has gripped the bars at the point spaced at least the distance a (twice the distance D) from their leading end. The first gripper assembly 22 subsequently releases the bars B at its extreme left hand position II.

Then the bars B being gripped by the second gripper assembly 26 is fed forwardly by the second overhead conveyor 14 the full stroke F2 of the second gripper assembly, as illustrated at (C) in FIG. 15. At the same time, the first gripper assembly 22 is returned to a position slightly forwardly of the extreme right hand position position I by the first overhead conveyor 12.

At (D) in FIG. 15 are shown the bars B subsequently bent right angularly by the bending mechanism 21 at a point distanced (F2+a−D) from its leading end. The thus bent bars are shown also at (B) in FIG. 14. The second gripper assembly 26 have released the bars B before they are bent and is left standing by at its extreme left hand position IV.

Then, as indicated at (E) in FIG. 15, the bars B are gripped by the first gripper assembly 22 at its position mentioned in connection with (C) in FIG. 15, are fed a distance F3, less than the distance F1, by the first overhead conveyor 12, and are released from the first gripper assembly.

Then, while the first gripper assembly 22 is returned to the extreme right hand position by the first overhead conveyor 12 as at (F) in FIG. 15, the bars B are right angularly bent at a point spaced the distance F3 from the first bend P1, as shown at (C) in FIG. 14. The first gripper assembly 22 grips the bars B at the extreme right hand position I.

Then, as depicted at (G) in FIG. 15, the bars B gripped by the first gripper assembly 22 are fed a distance F4, less than the distance F1, by the first overhead conveyor 12. Then, as shown also at (G) in FIG. 15, the bars are gripped by the second gripper assembly 26 at its extreme right hand position III. Subsequently released from the first gripper assembly 22, the bars are transported a distance F5 by the second overhead conveyor 14, as at (H) in FIG. 15.

Then the bars B have their trailing end portions bent right angularly as at (D) in FIG. 14 and at (I) in FIG. 15. The length of these trailing end portions of the bars is Lo−(F2+F3+F4+F5+a)+D.

The bending of the pile of bars B has now been completed, with the bent bars engaged around the holder posts 204 at the bending station 16 as in FIG. 13. For the disengagement of the bent bars from the holder posts 204, the second gripper assembly 26 is carried back a distance F6, less than its full stroke, F2, from its extreme left hand position IV, and is caused to grip the bent bars. Then, as illustrated at (F) in FIG. 15, the second gripper assembly 26 is raised by the fluid actuated cylinder 144, FIG. 1, on the carriage 28, thereby lifting the bent bars out of engagement with the holder posts 204. At this time, as shown also at (J) in FIG. 15, the first gripper assembly 22 grips the next pile of bars B at its extreme right hand position I. The bent bars can be unloaded from the bending station 16 as the second gripper assembly 26 is subsequently transported the distance F6 to its extreme left hand position IV as at (K) in FIG. 15.

We understand that, notwithstanding the foregoing detailed disclosure, our invention is not to be limited by the exact details of its exemplary embodiment. Various modifications may be resorted to without departing from the scope of our invention as expressed in the following claims.

We claim:

1. Apparatus for feeding a bar or a plurality of bars along a predetermined path extending through a processing station such as a bar bending station, comprising:
- (a) a first conveyor extending between a loading end of the predetermined path and the processing station;
- (b) a first gripper assembly mounted to the first conveyor thereby to be reciprocably transported between the loading end and the processing station, the first gripper assembly being capable of releasably gripping a bar or a plurality of bars in a vertical pile for transporting same from the loading end to and through the processing station where the bar is processed;
- (c) a second conveyor arranged collinearly with the first conveyor and extending between the processing station and an unloading end of the predetermined path;
- (d) a carriage mounted to the second conveyor thereby to be reciprocably transported between the processing station and the unloading end;
- (e) a second gripper assembly mounted to the carriage on the second conveyor for up and down motion relative to the carriage, the second gripper assembly being also capable of releasably gripping a bar or a plurality of bars in a vertical pile for transporting same through the processing station in coaction with the first gripper assembly and further for transporting the processed bar or bars away from the processing station to the unloading end;
- (f) lift means for moving the second gripper assembly up and down on the carriage, the second gripper assembly gripping the processed bar or bars while being lowered and being subsequently raised with the processed bar or bars preparatory to transportation thereof to the unloading end;

wherein each of the first and second gripper assemblies includes,
- (a) pair of gripping jaws pivotable relative to each other;
- (b) a plurality of interchangeable sets of gripping teeth for gripping bars of different diameters, each set being comprised of at least one pair of gripping teeth to be replaceably mounted one to each gripping jaw in opposed relation to each other for engaging a bar or bars therebetween; and
- (c) means for pivoting one of the gripping jaws toward and away from the other for the engagement and disengagement of the bar between and from the opposed gripping teeth; and wherein the pair of gripping jaws of each gripper assembly have a pair of undercut grooves formed in their opposed faces for slidably engaging a selected set of a pair or pairs of gripping teeth, each pair of gripping teeth partly protruding from the undercut grooves for gripping a bar or bars therebetween, and wherein the apparatus further comprises means for retaining the gripping teeth engaged in the undercut grooves.

2. The apparatus of claim 1 wherein the undercut groove in one of the gripping jaws of each gripper assembly is adapted to permit the gripping tooth or teeth engaged therein to travel toward and away from the gripping tooth or teeth on the other gripping jaw, and wherein the apparatus further comprises a plurality of fluid actuated cylinders mounted to said one gripping jaw of each gripper assembly for urging under fluid pressure the gripping tooth or teeth mounted to said one gripping jaw toward the other gripping jaw for firm engagement of the bar or bars between the gripping teeth.

3. The apparatus of claim 2 wherein a piston rod of each fluid actuated cylinder extends into the undercut groove in said one gripping jaw of each gripper assembly and terminates in a relatively enlarged head, and wherein each gripping tooth to be mounted to said one gripping jaw has defined therein an undercut groove for engagement with the enlarged head of the piston rod so that the gripping tooth is movable with respect to said one gripping jaw toward and away from the other gripping jaw with the extension and contraction of the fluid actuated cylinder.

4. The apparatus of claim 3 wherein each fuid actuated cylinder has a return spring for holding the relatively enlarged head of its piston rod in a preassigned position within the undercut groove in said one gripping jaw of each gripper assembly when no fluid pressure is being delivered to the fluid actuated cylinder.

5. The apparatus of claim 2 further comprising means for locking the pair of gripping jaws against pivotal motion away from each other when the bar is engaged between the pair of gripping teeth.

6. The apparatus of claim 1 further comprising collapsible guide means mounted between the loading end of the predetermined path and the processing station for guiding a bar or bars being transported along the predetermined path, the collapsible guide means comprising:
- (a) a pair of spaced apart guides pivotable about an axis at right angles with the predetermined path and normally lying in a working position where the guides extend across the predetermined path for slidably engaging a bar or a pile of bars therebetween;
- (b) resilient means for normally holding the guides in the working position, the guides when pushed by the first gripper assembly being pivotable in either direction about the axis at right angles with the predetermined path against the force of the resilient means to allow the first gripper assembly to travel therepast.

7. The apparatus of claim 6 wherein the collapsible guide means further comprises:
- (a) a member movable toward and away from the predetermined path and having the guides and resilient means mounted thereon, the guides being pivotable with respect to the movable member about the axis at right angles with the predetermined path; and
- (b) means for moving the movable member between a first position, where the guides are normally held in the working position under the force of the resilient means, and a second position where the guides are retracted away from the predetermined path.